Jan. 30, 1923.
B. G. MYRAN.
SAW GUIDE.
FILED AUG. 6, 1921.
1,443,902.
3 SHEETS—SHEET 2.
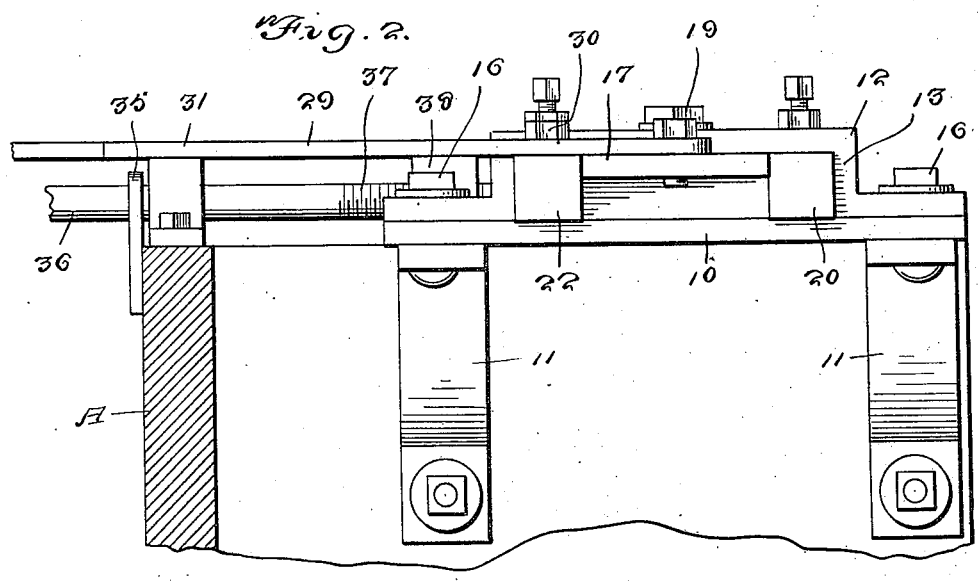
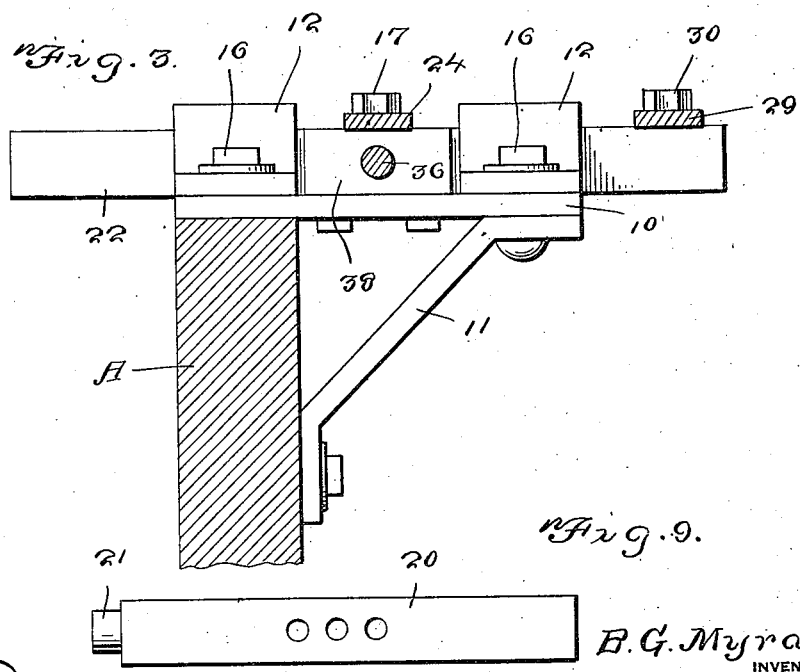

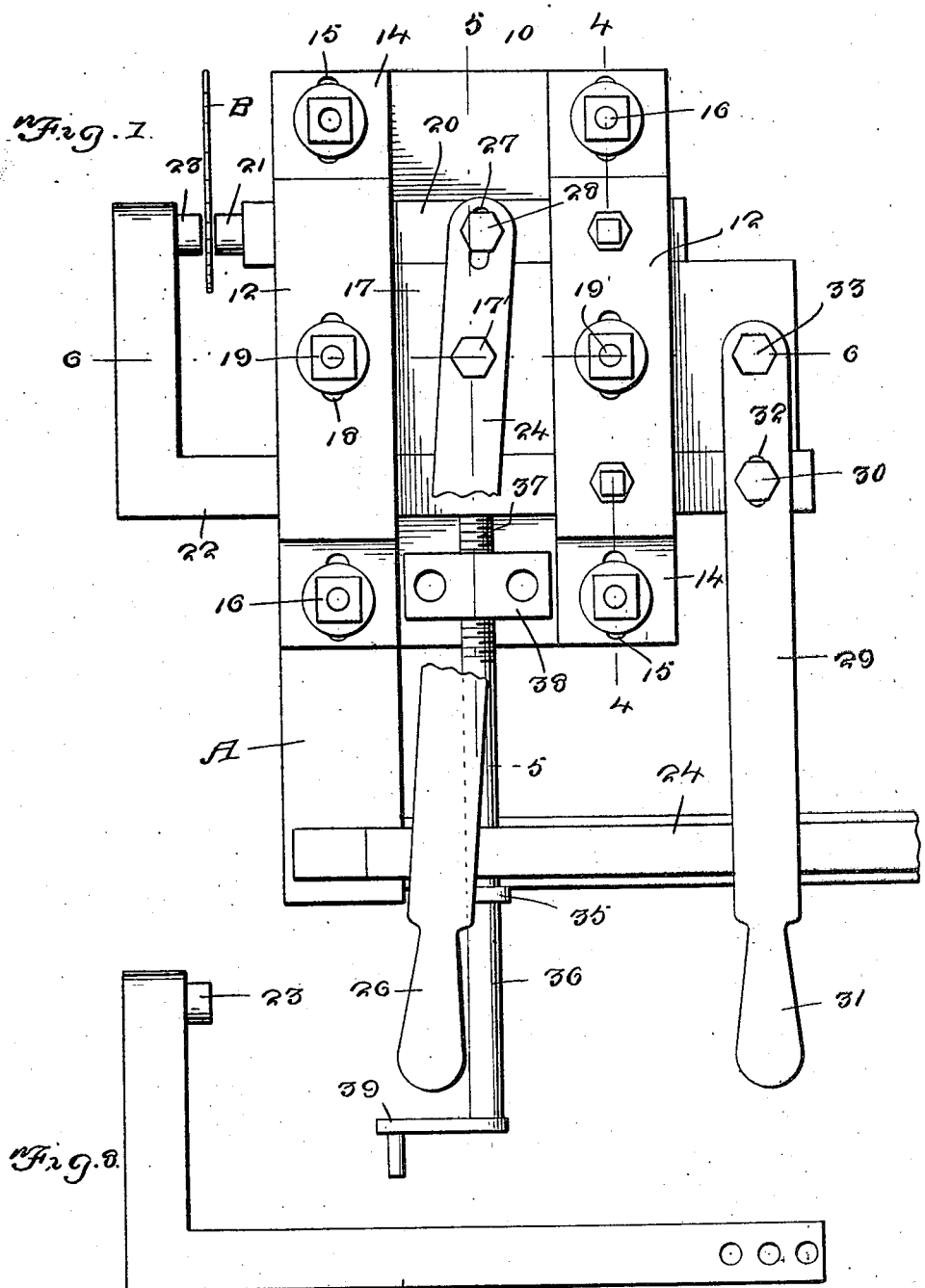

Jan. 30, 1923.

B. G. MYRAN.
SAW GUIDE.
FILED AUG. 6, 1921.

B. G. Myran INVENTOR

BY Victor J. Evans ATTORNEY

WITNESS: E. R. Ruppert.

Patented Jan. 30, 1923.

1,443,902

UNITED STATES PATENT OFFICE.

BENNIE G. MYRAN, OF SAND CREEK, WISCONSIN.

SAW GUIDE.

Application filed August 6, 1921. Serial No. 490,271.

*To all whom it may concern:*

Be it known that I, BENNIE G. MYRAN, a citizen of the United States, residing at Sand Creek, in the county of Dunn and State of Wisconsin, have invented new and useful Improvements in Saw Guides, of which the following is a specification.

This invention relates to saw mill appliances, particularly to saw guides, and has for its object the provision of a novel device adapted for association with a rotary saw, the parts of the device being readily adjustable in every way whereby to effect the proper guiding action.

An important object is the provision of a device of this character which is provided with novel means for adjusting a pair of guides which are located at the outside and inside of the saw, the adjusting means permitting guide pins to be spaced at any desired distance from the saw.

Another object is the provision of a device of this character which is provided with novel means whereby to positively lock or jam the guide members so that displacement thereof will be prevented under all circumstances.

A further object is the provision of a device of this character which will be very safe for the operator inasmuch as he does not have to leave his position to make the necessary adjustment and does not have to place his hands anywhere near the rapidly rotating saw, it being well known that it frequently occurs that a sawyer has a hand cut off while performing the necessary adjustment and manipulations around the saw.

Still another object is the provision of a device of this character in which the guide members are themselves effectively guided by supporting yokes, means being provided for regulating the friction on the guide members so that they may be moved with more or less readiness and may not move too easily.

An additional object is the provision of a device of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings in which, Figure 1 is a plan view of my device.

Figure 2 is a side elevation thereof.

Figure 3 is a front elevation with parts in section.

Figs. 8 and 9 are detail elevations of the guide members detached.

Figure 4:
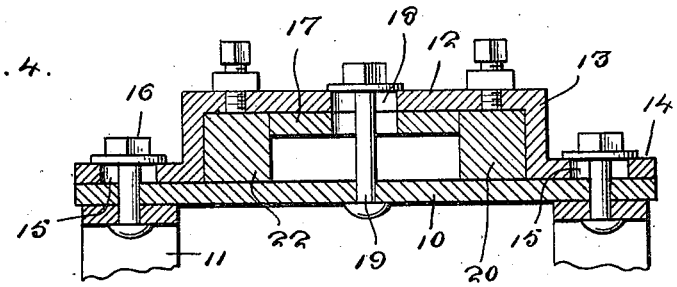
Figure 4 is a sectional view on the line 4—4 of Figure 1.
Figure 5:
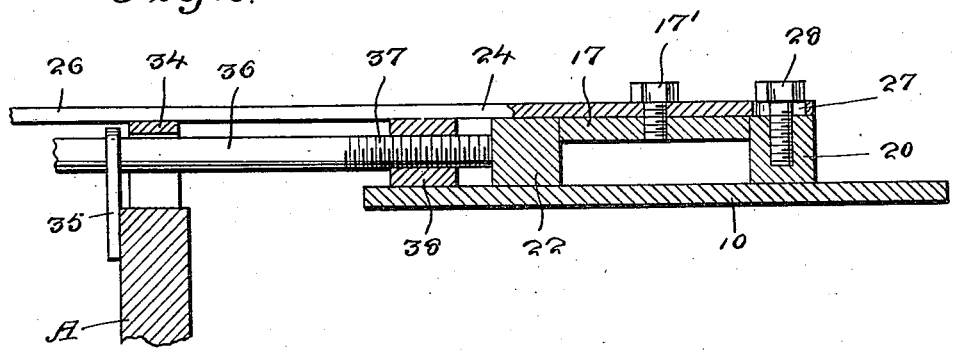
Figure 5 is a sectional view on the line 5—5 of Figure 1.
Figure 6:
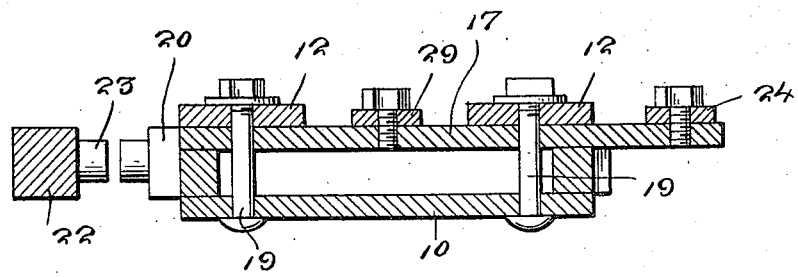
Figure 6 is a cross-sectional view on the line 6—6 of Figure 1.
Figure 7:
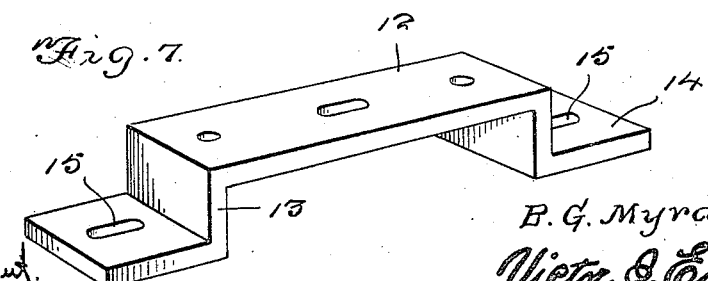
Figure 7 is a detail perspective view of one of the guide yokes.

Referring more particularly to the drawings the letter A designates a portion of the frame of a saw mill and B designates a buzz-saw mounted thereon and driven in the usual manner. Unnecessary produced details of the ordinary saw-mill mechanism are not disclosed as they are not essential to a proper understanding of the present invention.

In carrying out my invention I provide a base plate 10 which is mounted upon the frame A and which is braced by a plurality of inclined brace bars 11 suitably bolted to the frame A and to the plate 10. Disposed upon the plate 10 in spaced parallel relation and extending longitudinally of the plate, that is parallel with the saw B, are similar yokes 12 which have their intermediate portions off-set upwardly as shown at 13 and which have their end portions constituting bearing feet 14 resting upon the plate 10. The portions 14 are formed with elongated slots 15 through which pass bolts 16 passing into the plate 10 and which are for the purpose of securing the yokes 12 adjustably in position. Disposed upon the plate 10 and located beneath the upwardly off-set portions 13 of the yoke 12 is a plate 17 which is a species of filler-plates and which extends laterally beyond the right hand yoke 12 as shown. The upwardly off-set portions 13 of the yokes 12 are formed with elongated slots 18 through which pass bolts 19 screwed through the plate 17 whereby to hold the latter in position and whereby the yokes may be adjustably mounted with respect to the plate 17.

Slidably mounted through the upwardly off-set portions 13 of the yokes, at one end thereof, is a bar 20 which has one end carrying a guide pin 21 disposed in slightly spaced relation to one side of the saw B. This bar 20 is disposed between one edge of the plate 17 and the adjacent vertical portions of the yokes 12 as clearly shown. Incidentally this bar 20 is adjustable longitudinally whereby to vary the distance between the guide pin 21 and the saw. The outer guide member comprises an L-shaped bar 22 which is slidably mounted between the other edge of the plate 17 and the adjacent vertical portions of the yokes 12 as clearly shown, the shorter arm of this L-shaped bar 22 carrying a guide pin 23 disposed in alignment with the pin 21 but at the opposite side of the saw blade. The bar 22 is likewise longitudinally adjustable within the yokes whereby to vary the distance between the pin 23 and the saw.

In order to effect movement of the guide bar 20, I provide a lever 24 which is pivoted at 25 upon the plate 17 and which has one end elongated to constitute a handle 26 and which has its other end formed with an elongated slot 27 through which passes a bolt 28 screwed into the bar 20. By shifting the lever 26 back and forth it will be readily apparent that the bar 20 may be moved longitudinally.

I also provide a lever 29 which is pivoted by a bolt 33 upon the plate 17 and which has one end elongated to form a handle 31. This lever has its intermediate portion formed with an elongated slot 32 through which passes a bolt 30 screwed into the bar 22 at one end of the latter. By shifting the lever 29 back and forth it will be readily apparent that the guide bar 22 may be shifted longitudinally for varying the distance between the pin 23 and the saw B.

In order to provide means for holding the guide bars at their desired adjusted position, I make use of a transversely disposed bearing member 34 which is suitably bolted to the frame A and which carries a bearing 35 through which is rotatably mounted the smooth portion 36 of a screw 37 which is threaded through a block 38 secured upon the plate 10, with the free end of this screw 37 engaging the rear face of the guide bar 22.

The screw 37 has its opposite end formed with a squared portion 39 adapted for engagement by a suitable wrench whereby the screw may be rotated. When the screw is rotated in a cross-wise direction, it will be quite readily apparent that the screw 37 will have its free end bear firmly and strongly against the rear edge of the guide bar 22 whereby to force the latter into engagement with the rear edge of the plate 17 so as to hold the parts locked.

In the operation of the device it will be readily apparent that when the occasion arises, the operator may quickly and easily adjust the positions of the guide members 20 and 22 with respect to the saw B simply by loosening the screw 37 and then shifting the levers, one or both, 24 and 29 whereby to move the guide bars 20 or 22 as the case may be so as to bring the guide pins 21 and 23 into the desired position with respect to the saw blade B. When the proper adjustment has been effected, it is merely necessary that the operator turn up the screw 37 whereby to jam the member 22 and prevent movement of the parts. It will be apparent that owing to the provision of the longitudinal slots within the yokes 12 that ample adjustment may be made so that the guide pins 21 and 23 may be brought into proper relation to a saw regardless of the diameter thereof.

From the foregoing description and a study of the drawings it will be readily apparent that I have thus provided a simply constructed and consequently inexpensive saw-guide for use in connection with buzz-saws whereby the proper adjustment may be effected without it being necessary for the operator to place his hand anywhere near the saw, the device being consequently very safe in operation and being in other respects highly efficient so that it will effectually perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having described my invention I claim:

1. A saw guide comprising a base plate, a pair of spaced parallel guide-yokes having longitudinal adjustment thereon, a pair of bars slidable crosswise of the guide yokes and respectively presenting guide pins at corresponding ends, a filler plate secured to the said yoke and located between the said bars, levers for adjusting the said bars, and screw operated means for moving one of the said bars against the said filler plate to hold the parts against movement.

2. A saw guide comprising a base plate, a pair of longitudinally adjustable guide-yokes mounted thereon in spaced parallel relation to each other, a filler plate disposed crosswise of the said yokes and adjustably connected to the latter for movement longitudinally thereof, said plate having its longitudinal edges spaced inwardly from the adjacent portions of the said yokes to define a guide-way along each longitudinal edge of the said plate, a slide bar disposed in each guide-way, said bars having corresponding ends provided with pins for engaging a saw therebetween, a pair of independently movable levers pivoted to said filler plate and respectively connected with a slide bar, and means for exerting a lateral thrust on said bars and plate whereby the latter may be clamped against the said yokes.

3. A saw guide comprising a base plate, a pair of spaced parallel yokes secured to the base plate, a pair of slidable bars having movement across the plate and under the said yoke, said bars having guide pins for engaging a saw therebetween, a filler plate between the said bars, said plate having adjustable connection with the said yokes whereby it is movable adversely to the said bars, means for adjusting the bars transversely of the said yoke, and clamping means for holding the said bars in adjusted position, said means including a member movable against one of the bars for exerting a lateral thrust thereon whereby the said bars and filler plate may be forced into binding engagement with each other.

In testimony whereof I affix my signature.

BENNIE G. MYRAN.